United States Patent [19]

Maresh

[11] Patent Number: 5,376,202
[45] Date of Patent: Dec. 27, 1994

[54] METHOD OF FORMING AN ADHESIVE TAPE TUBE

[76] Inventor: Joseph D. Maresh, 19919 White Cloud Cir., West Linn, Oreg. 97068

[21] Appl. No.: 14,725

[22] Filed: Feb. 8, 1993

[51] Int. Cl.5 .............................................. B29C 53/00
[52] U.S. Cl. ...................................... 156/203; 156/250
[58] Field of Search ............... 156/203, 466, 201, 202, 156/250, 483, 484; 225/6, 56, 54, 88; 493/269, 288, 302

[56] References Cited

U.S. PATENT DOCUMENTS

| | | | |
|---|---|---|---|
| 2,309,093 | 1/1943 | Borden | 225/6 |
| 2,631,509 | 3/1953 | Whytlaw | 493/269 |
| 3,485,147 | 12/1969 | Hurst | 493/288 |
| 3,495,506 | 2/1970 | Plymale | 156/218 |
| 3,747,483 | 7/1973 | Hurst. | |
| 4,478,670 | 10/1984 | Heyse et al. | 493/302 |

Primary Examiner—Michael Ball
Assistant Examiner—Richard Crispino

[57] ABSTRACT

A pressure sensitive tape tube former designed to configure standard one sided adhesive tape into tubed tape with the pressure sensitive adhesive side of the tape oriented at the outer circumference there on. The tubular profile is established by passing the tape past a profile configurator to cause the tape to transversely form an overlapping spiral cone, and allowing the outer overlapping edges of the tape to merge together and become in mutual adhesive contact beyond said configurator, thereby forming the tubed tape.

2 Claims, 6 Drawing Sheets

METHOD OF FORMING AN ADHESIVE TAPE TUBE

BACKGROUND OF THE INVENTION

The prior art is replete with tape dispensing devices which generally support a tape roll, and provide a cutter or blade for tearing short lengths off of the roll at desired tape lengths. Often, as in schools and the like, it is desired to configure a short segment of pressure sensitive adhesive tape into a loop with the adhesive oriented at the outer circumference there on, in order to affix papers of miscellaneous nature to windows and walls. It is desirable to apply tape to the back of the article so that the tape is not visible, and so that the front surface of the article will not be damaged.

The market has responded to this demand by manufacturing double sided tape which has the adhesive applied to both sides of the tape; but tape of this nature has not found favor for this application for several functional reasons, in addition to higher expense.

One functional reason pertains to poor adhesive strength when double sided tape is affixed between mutually nonparallel and/or irregular nonconforming surfaces. Subjected to such conditions, the effective surface-to-surface contact area is substantially reduced. The single layer of tape simply cannot conform to two opposed surfaces spaced apart at a distance greater than the thickness of the tape, whereas a loop form will.

Another functional reason relates to tape removal difficulty when papers are to be taken down. During removal, the double sided tape will remain on the surface to which it has the greatest adhesion; and most often, as in the case when it has been applied to windows, must be scraped off of the glass with the use of a razor blade. If a piece of looped tape had been utilized, one can readily pull the loop off with minimal difficulty; including painted surfaces in which the action of peeling a tape loop off is less likely to cause paint removal.

One invention which attempted to facilitate the formation of tape loops may be seen by U.S. Pat. No. 3,747,483, James A. Hurst; which discloses a device which incorporates a rod mandrel about which the tape is to be wound when forming a loop or tube. This invention did not achieve commercial success in part because the operator is still required to physically wind the tape. An earlier invention by the same, U.S. Pat. No. 3,485,147, provided a powered means to accomplish the same result, albeit in a costly and complicated manner.

Despite these options available to consumers, the enduring art of looping tape has remained as the popular choice, and a need has continued for the development of an inexpensive and efficient tape looper or tube former which greatly expedites the process.

BRIEF DESCRIPTION OF THE INVENTION

The present invention provides a means to continuously longitudinally form adhesive tape into a tube. The method direction of the present invention departs from the method direction of known prior art in that the loop is respectively formed side over side with wide tape as opposed to end over end with narrow tape. The critical element necessary to accomplish this is referred to in this text as a profile configurator.

In accordance with one of the adaptations of this invention, a frame is provided, to which at one end a tape supply roll is rotatably secured. At the opposite end, in the embodiments which provide a means to cut the tape tube, a blade is secured there on. In close proximity to the tape supply roll is a deflector to ensure tape is fed to the profile configurator from a constant direction, regardless of the reducing diameter of the supply roll as the tape is drawn off.

The profile configurator may be designed in several manners, and at multiple progressive locations, with the objective of curling the flat tape into a transverse overlapping spiral with the pressure sensitive adhesive oriented outwardly so that a tubular form will develop thereafter.

The profile configurator must, in all embodiments, minimize contact with the adhesive side of the tape. Furthermore, limitations exist as to the distance between the profile configurator and the tape deflector. This distance must be sufficiently great as to allow the flat tape to be geometrically transformed into the proper transverse spiral. If the profile configurator is positioned too close to the tape deflector, it will not be possible for the spiral shape to correctly develop; however, if the tape deflector is modified to cause the tape to bow or bend laterally in a plane perpendicular to the tape path, then the distance between the profile configurator and the tape deflector may be reduced.

An additional station is necessary on dispensing units incorporating this invention in order to allow for satisfactory operation. This station will provide for a tape tube tack down platform and is to be located between the profile configurator and the cutting blade. The dimensions of this platform must be sufficient to allow for adequate adhesive surface contact area of said platform against the formed tube in order to temporarily maintain the tube at a readily graspable location, and is needful because significant tape tension is present due to the variable tape profile generated at the profile configurator.

This method of causing a transverse spiral to be produced from the flat adhesive tape may be incorporated into self contained dispensing units as indicated above, or may be utilized to manufacture coils or rolls of tubed tape in order that the manufactured rolls be transferred by consumers to basic dispensing units similar to those dispensing units used for standard flat adhesive tape.

It may be noted that rolls of tubed tape thus coiled would not be as laterally stable as standard tape rolls. This reduced lateral sliding resistance is due to lack of adhesion between the inner surfaces of each of the collapsed tubular layers, and due to the fact that three layers of tape are present at each of the collapsed tubular layers wherever tape edge overlapping exists.

BRIEF DESCRIPTION OF THE DRAWINGS

The invention will be further described in conjunction with the accompanying drawings, which illustrate preferred embodiments, and wherein.

DETAILED DESCRIPTION OF THE INVENTION

Figure 1:
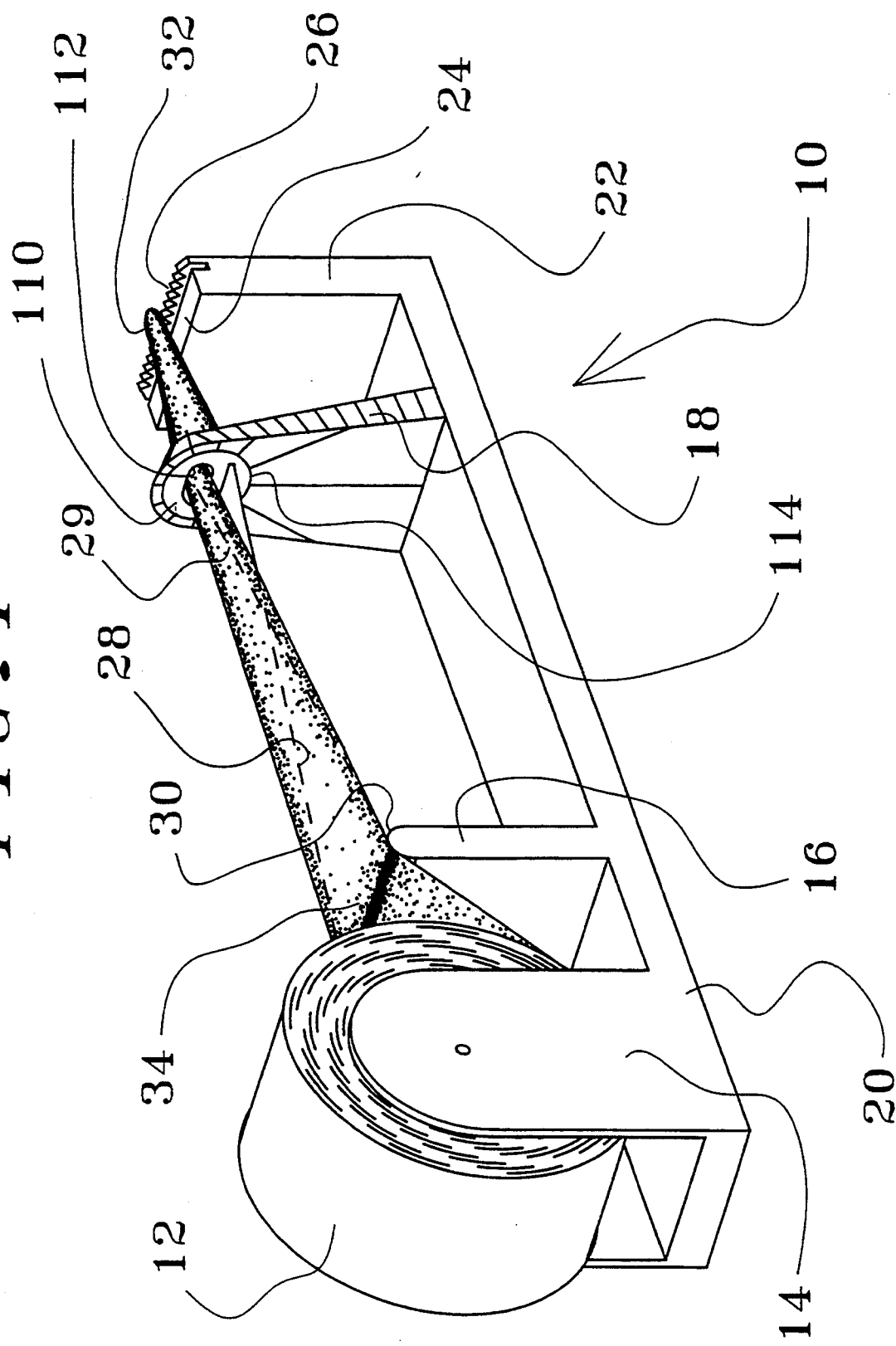
FIG. 1 is a perspective view of the first embodiment.

As shown in FIG. 1, the adhesive tape tube former dispensing unit 10 in accordance with the first embodiment of the invention comprises base 20 to which end standards 14 are affixed in order to rotatably support a pressure sensitive adhesive roll 12. The adhesive tape is illustrated with the adhesive 34 applied to the radially inward surface of each layer in the tape roll 12, although this invention will operate properly by minor alterations with tape rolls alternatively supplied with adhesive applied to the radially outward surface of the tape.

In order to present the adhesive tape from a constant direction and elevation to the profile configurator 110, a tape deflector stand 16 is affixed to base 20 in close proximity to tape roll 12, and is in contact with the tape at deflector stand arcuate surface 30.

Profile configurator plate 110 is mounted within configurator support 18 at parting line 114. The profile configurator illustrated in this drawing is represented with a plan view in FIG. 3.

Continuing with FIG. 1, the adhesive tape is shown passing through profile configurator 110 at arcuate slot 112. Tape edges 28 and 29 pass through the profile configurator in an overlapping, mutually noncontacting fashion, such that a tubular form is developed at tape tube 32. In order to provide a platform to maintain the tubed tape at a readily available grasping location, end stand 22 has a tack down platform 24 established at its upper surface. Serrated cutting blade 26 is provided for tearing tape tube 32 to desired length.

Figure 2:
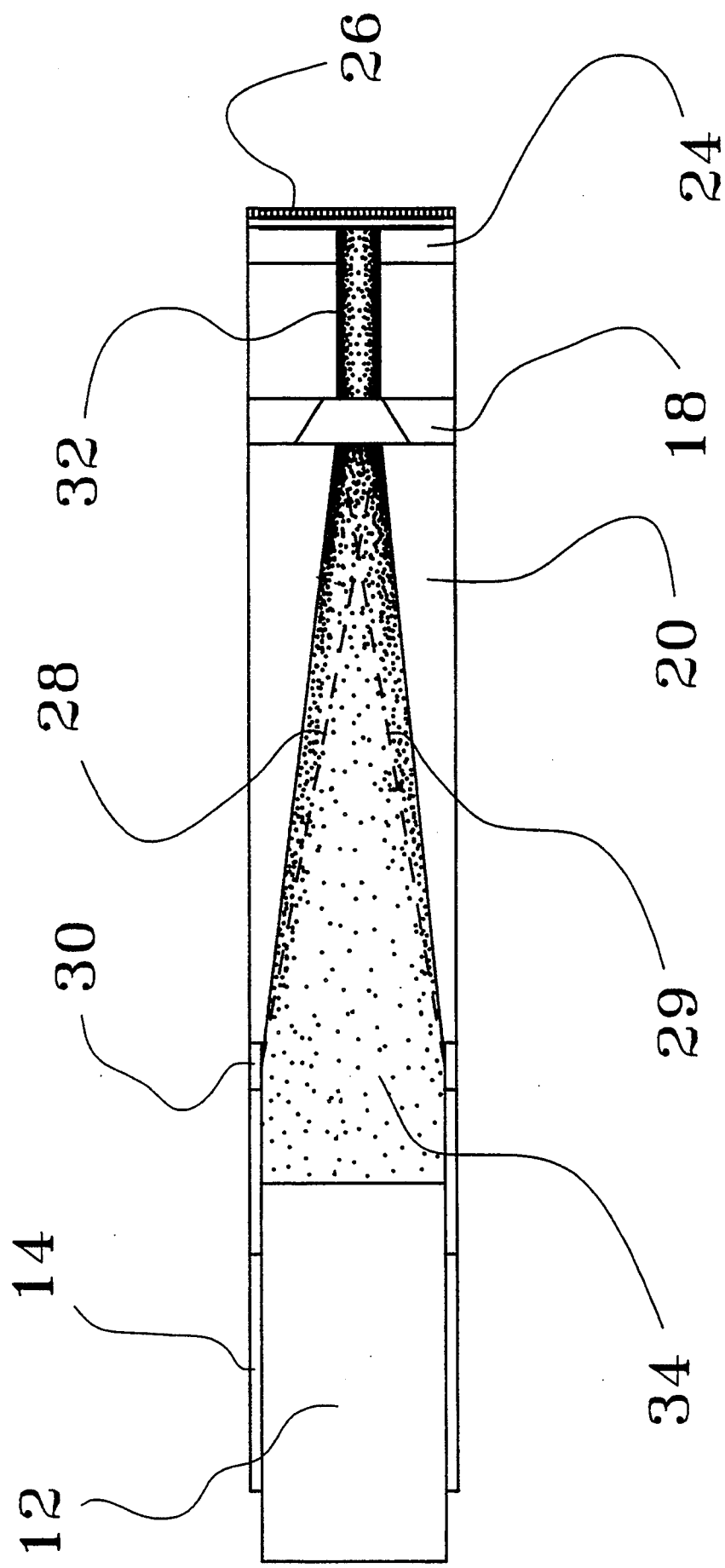
FIG. 2 is a top plan view of the first embodiment.

Referring now to FIG. 2, a top plan view is shown of the embodiment illustrated in FIG. 1, where tape roll 12 is shown mounted between end standards 14, which in turn are affixed to base 20. The tape adhesive 34 is directed toward the viewer, with the opposite smooth side of the tape in contact with deflector stand arcuate surface 30. Tape edges 28 and 29 are represented by dashed lines and are shown to crossover, but not make mutual contact, within configurator support 18. This crossover causes the tape to form a closed tubular profile beyond the profile configurator 110 at tape tube 32. Tack down platform 24 is spaced away from, and at an equal or higher elevation to serrated cutting blade 26.

Figure 3:
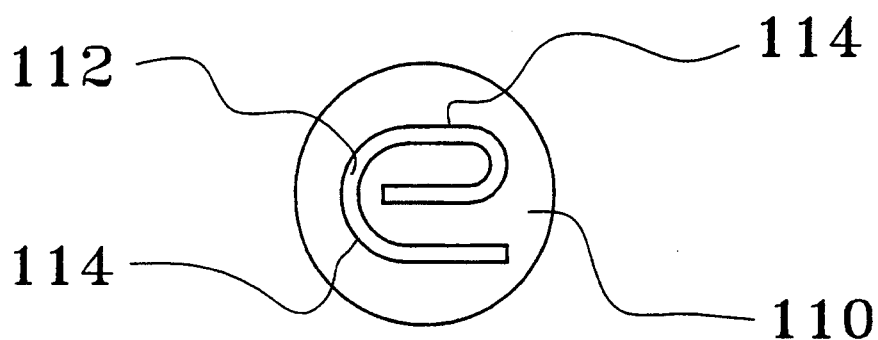
FIG. 3 is a front plan view of the profile configurator utilized in the first embodiment and is constructed exclusively from a flat plate.

Directing attention now to FIG. 3, a front plan view is shown of the profile configurator utilized in the first embodiment. This configurator consists of a plate 110 of minimal thickness. This plate is by necessity thin because the tape must pass through it at arcuate slot 112, and if the plate thickness is substantial, the outward, adhesive side of the tape, will adhere to portions of the arcuate slot wall 114; thus causing increased tape motion resistance to the effect of a malfunction. The length of the arcuate slot wall 114 is approximately equal to the total flat width of the tape and is established to approximate an overlapping spiral.

Figure 4:
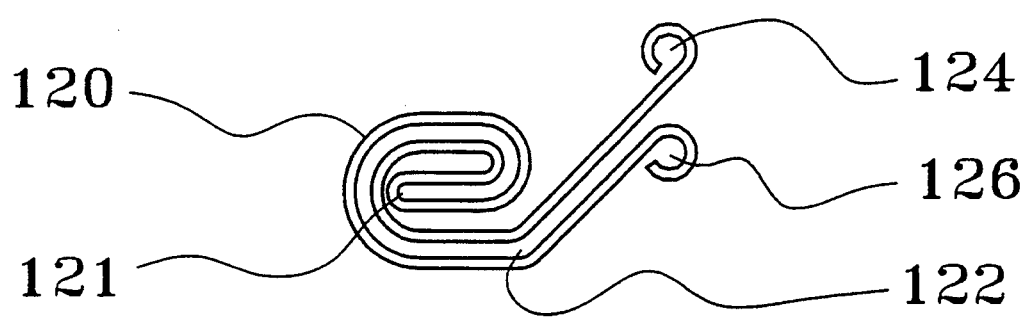
FIG. 4 is a front plan view of a second design of a profile configurator and is constructed exclusively from material in rod form.

Referring to FIG. 4, a front plan view is shown of a profile configurator constructed of wire rod. Wire 120 is secured at one distal end to upper curl 124, and at the opposite distal end to lower curl 126. One lateral edge of the adhesive tape will pass in close proximity to fold bend 121, and the opposite lateral edge of the tape will be forced to follow a circuitous spiral route to angle bend 122.

Comments are perhaps in order here to explain the importance of forcing the adhesive tape to form a lateral, openly overlapping spiral in order for this invention to operate successfully. It is apparent when considering the tape material properties that minimal resistance to bending exists. If the flat tape is simply passed through a circular hole, the circular profile of the tape cross section will be unstable and highly subject to collapse. When such collapse occurs, the profile may be represented as a crescent, resulting in a malfunction during the formation of the tape tube. Furthermore, a circular hole will not function satisfactorily as a profile configurator because collapse or disorientation will likely also occur when the formed tube is grasped and pulled during the act of tearing tubes to desired lengths. If one attempts to add a suspended disk within the center of the circular hole, and allows for clearance such that the tape may pass between the circular hole and the suspended disk during an edge to edge contacting, overlapping fashion; again a malfunction occurs because, although tape edge overlapping may be initially established, tape edge overlapping will not occur continuously and automatically upon tape motion. In figurative terms, the tape walks out of the overlapping condition as the tape is pulled. It is necessary, for this invention to operate properly, that overlapping edge to edge self contact not occur until after the tape has been properly configured in order that the overlapping tape edges merge together radially.

Also, as has been briefly discussed earlier in the text, and will now be expanded upon; the profile configurator may not be arbitrarily located at any point along the tape path. The proper location of the profile configurator is a function of the tape width, the preconfigured status of the tape, and the dimensions of the spiral profile to be produced upon the tape, in addition to less critical variables.

If the profile configurator is positioned too close to the tape roll, in the absence of preconfigurators or modified tape deflectors, a spiral profile will not be allowed to form because the tape will seek to maintain a flat profile. Essentially, the opposite lateral edges of the tape will be subjected to tensile forces, and tape bunching will occur at those regions of the profile configurator which correspond closest to where the edges of tape would exist if the tape was unrestricted.

If the profile configurator is located too far from the tape roll, again excluding considerations of tape deflectors or preconfigurators, unsatisfactory operation of this invention also will result. In this instance, the malfunction occurs between the profile configurator and the tack down platform. In explaining this, the reader may wish to refer to FIG. 2, which illustrates a top view with the tape edges referenced as 28 and 29. These edges are converging, intersecting, and then finally overlapping (but not self contacting) within the profile configurator. In so doing, a spiral cone is formed between the deflector and the profile configurator. With increased distance between the tape roll and the profile configurator, this cone angle is reduced. The resulting spiral cone caused to form at the profile configurator is therefore minimized, and tends to no longer form beyond the profile configurator to the effect that although the tape edges may be overlapping, they will not merge together radially to make mutual adhesive contact. All points along the tape path beyond the profile configurator tend to remain parallel, and because contact within the profile configurator is not allowed, the spiral profile remains open. Moreover, by increasing the distance between the tape roll and the profile configurator, tube formation is also affected in that proper tube formation becomes overly sensitive to lateral placement location of the tape tube onto the tack down platform.

Figure 5:
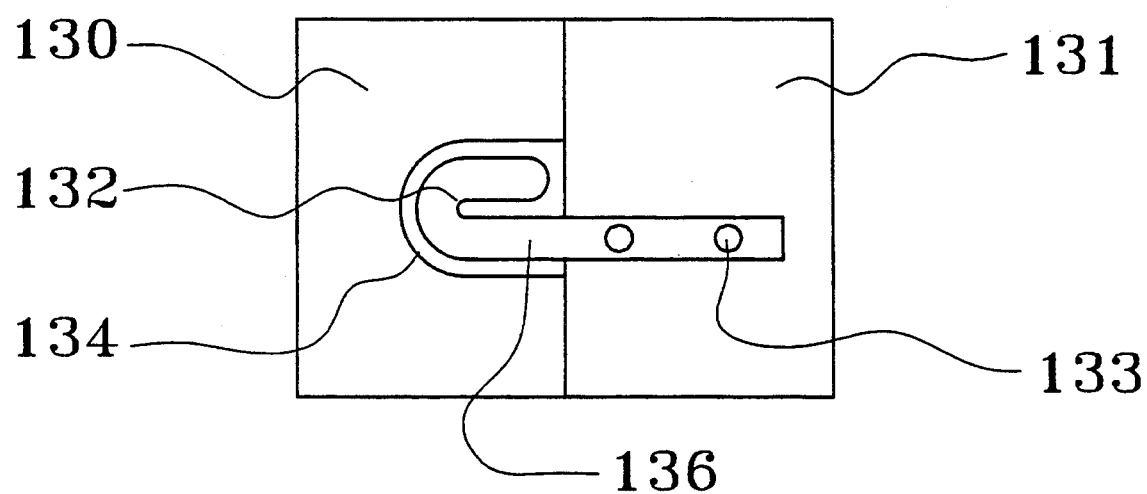
FIG. 5 is a front plan view of a third design of a profile configurator and is constructed with both flat plate and rod.

Directing attention now to FIG. 5, a third design of a profile configurator is represented in a front plan view. The intent in the design of this profile configurator is to facilitate tape threading (during set up) through the configurator. Indented plate 130 is constructed of minimal thickness, with arcuate notch 134 established to be in contact with the adhesive side of the tape. During unit operation, this indented plate 130 will be juxtaposed to hook plate 131. Hook form 136 is secured to hook plate 131 by means of rivets 133, and is located such that hook form 136 will become aligned on center with arcuate notch 134. When installed properly, one edge of the spirally configured tape will be in proximate contact with the inside hook radius 132, with the adhesive oriented downward (outward).

To facilitate threading of the tape, indented plate 130 may be moved apart from hook plate 131, after which one tape edge may be positioned at the inside hook radius 132; thereafter, while maintaining this tape edge position, the indented plate 130 may be moved back toward the operational position, thereby forcing a lateral cross section of the tape to represent the necessary spiral shape. It may be noted that tape threading during setup for any of the configurator designs disclosed is aided by folding a short length of the tape, at the end of the tape, longitudinally over onto itself with the adhesive side oriented to the interior of the fold, thereby serving as a pilot.

Figure 6:
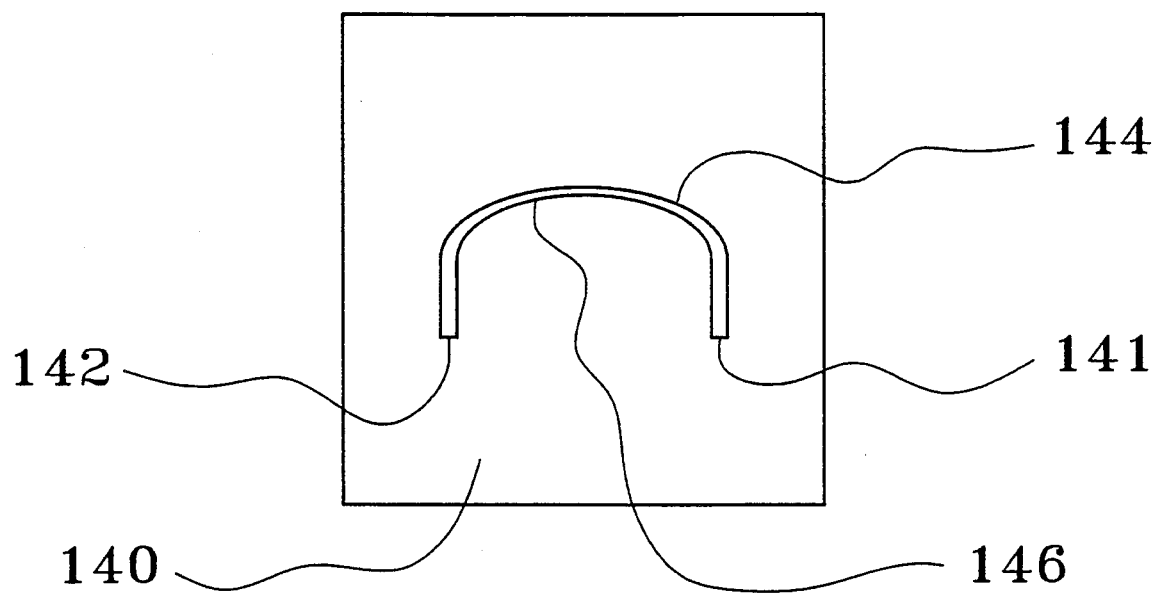
FIG. 6 is a front plan view of a preconfigurator.

Referring now to FIG. 6, a preconfigurator is shown in a front plan view. This preconfigurator may be positioned such that the tape will pass through it before the tape passes by or through the final configurator. One objective of utilizing multiple configurators is to reduce the distance between the tape supply roll and the final configurator. Plate 140 may be attached to the apparatus base in a fixed manner. The adhesive side of the tape will pass in proximate contact to outer radial slot wall 144, and the glossy smooth side of the tape will pass in proximate contact to inner radial slot wall 146. The tape will also pass through this slot such that the left edge of the tape will pass in proximate contact to left slot side 142, while the right edge of the tape will pass in proximate contact to right slot side 141.

Figure 7:
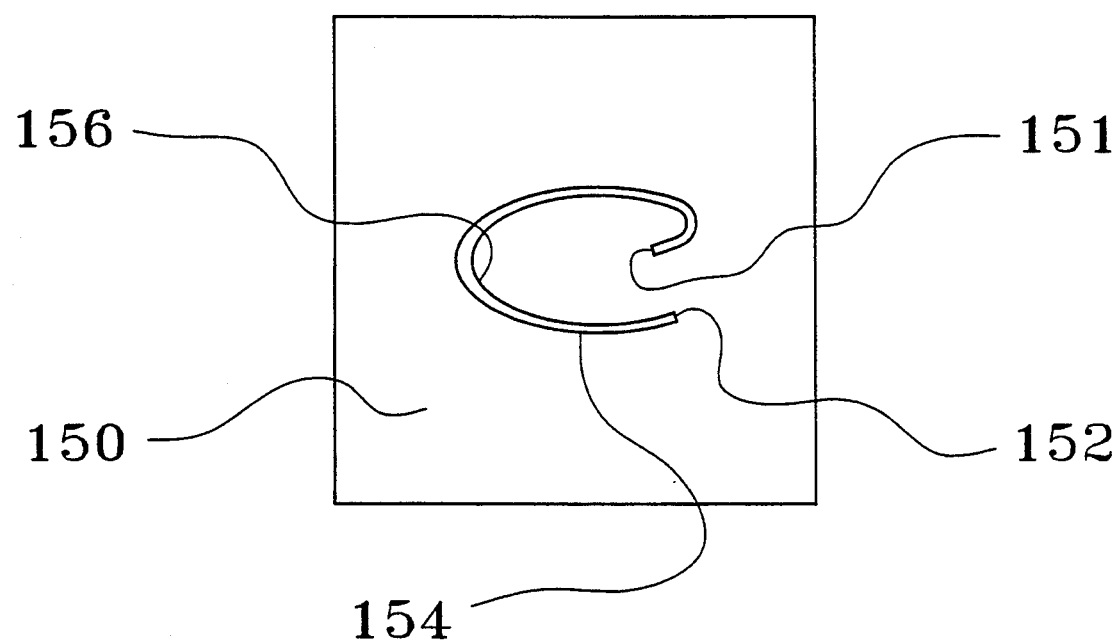
FIG. 7 is a front plan view of a preconfigurator which is geometrically further evolved than the preconfigurator shown in FIG. 6.

Directing attention now to FIG. 7, another preconfigurator is shown. This preconfigurator may be characterized as being geometrically more evolved (or closer resembling the final configurator), than the preconfigurator shown in FIG. 6. Identifying the principal features in FIG. 7, we have outer arcuate wall 154 which will be subjected to frictional sliding contact with the adhesive side of the tape, inner arcuate wall 156, upper slot side 151, and lower slot side 152. As in FIG. 6, the total arcuate length of the slot in FIG. 7 is approximately equal to the flat width of the tape. It may be noted that the preconfigurator shown in FIG. 6, and the preconfigurator shown in FIG. 7, may be used together at different points along the tape path prior to the final configurator, with the preconfigurator of FIG. 6 in advance (up stream) of the preconfigurator of FIG. 7. Furthermore, the employment of multiple configurators also could entail specific tape contacting elements, such as dowels, pegs, or even rollers, to accomplish the same result.

Figure 8:
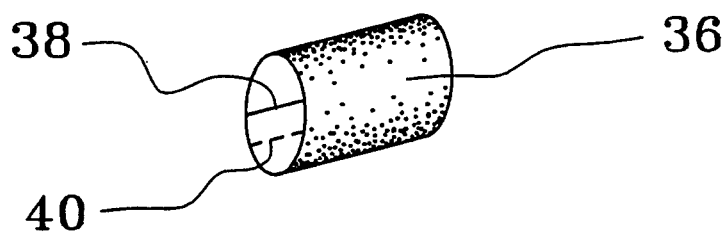
FIG. 8 is a perspective view of a short piece of tubed tape which may be referred to as a loop, capable of being formed with this invention.
Figure 9:
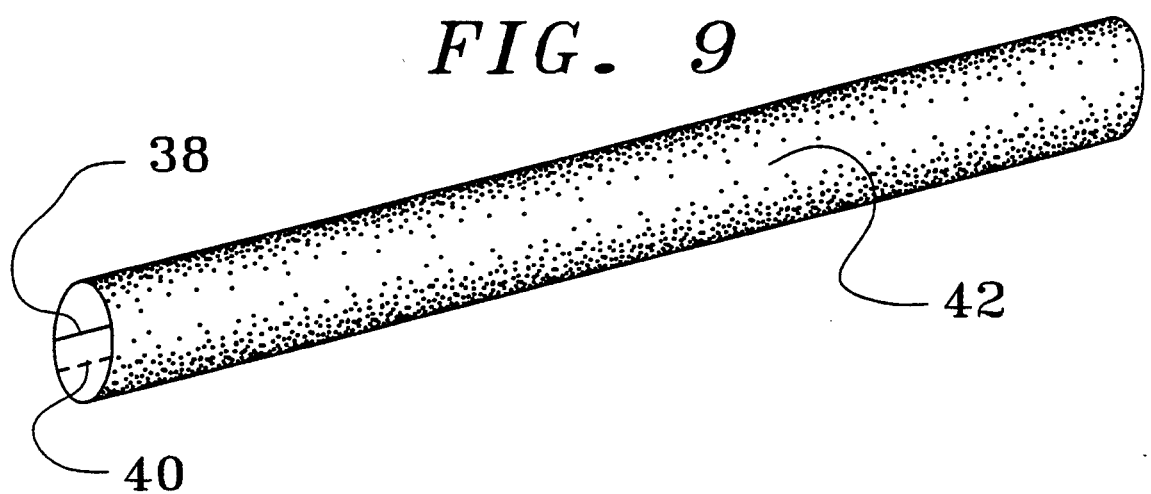
FIG. 9 is a perspective view of a long piece of tubed tape capable of being formed with this invention.

Continuing with the drawings, and referring now to FIG. 8, a short piece of tubed tape capable of being formed with this invention is shown with the adhesive oriented outward. This short piece 36, with inner edge 38 adheringly overlapping outer edge 40, may be commonly referred to as a tape loop due to its geometrical proportions. The long piece 42 shown in FIG. 9, with corresponding inner edge 38 and outer edge 40, due to its geometrical proportions, may be commonly referred to as tubed tape.

Figure 10:
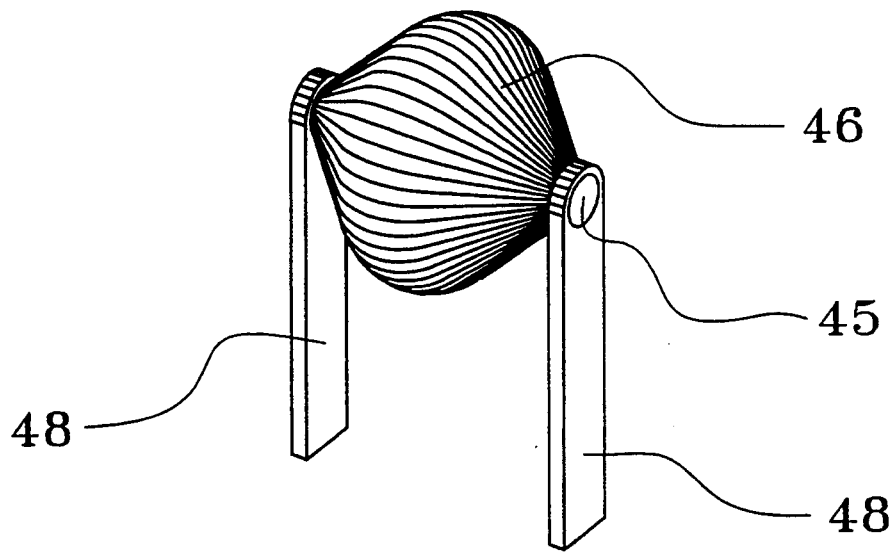
FIG. 10 is a perspective view of an alternative design for the tape deflector. This tape deflector consists of a rotatable sphere and is utilized on the second embodiment.

Referring now to FIG. 10, a spherical deflector 46 is shown to be rotatably supported between spherical deflector standards 48 at spherical deflector axle 45. The spherical geometry of this deflector will bend the tape laterally in a plane perpendicular to the tape path as to allow the profile configurator to be located closer to the tape roll, thereby shortening the unit length. It would also be possible to use one or more preconfigurators in conjunction with this spherical deflector to further minimize the unit length.

Figure 11:
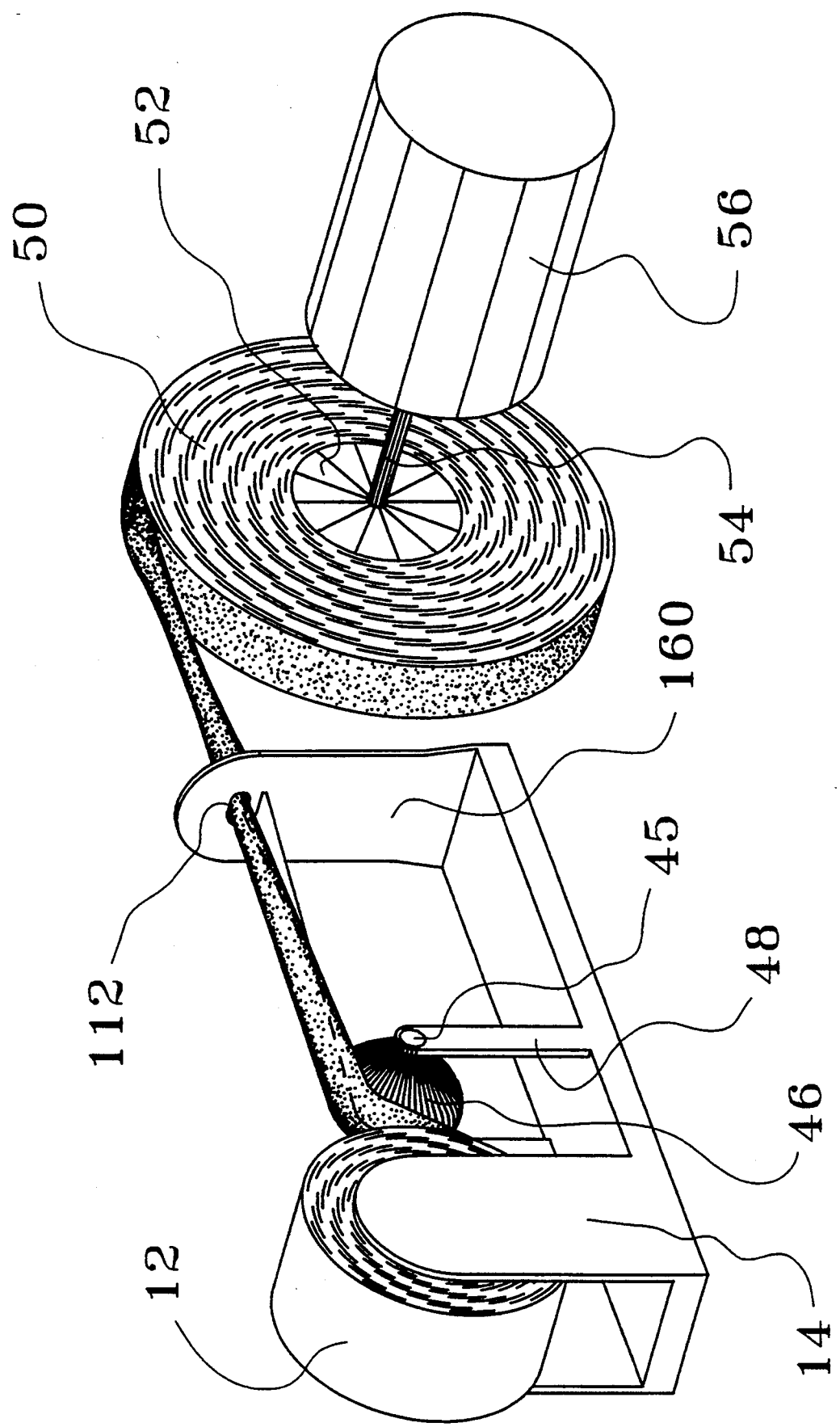
FIG. 11 is a perspective view of a second embodiment.

Finally, directing attention now to FIG. 11, this invention is shown incorporated upon an apparatus which may be utilized to convert flat tape to tubed tape in a continuous manner; and store the tubed tape, in collapsed form, onto a take-up roll. Supply roll 12 is supported by end standards 14. Tape is passed over spherical deflector 46 and through profile configurator at arcuate slot 112. The configurator form established at arcuate slot 112 is identical to the configurator form illustrated in FIG. 3, and is integral with configurator standard 160.

Continuing with FIG. 11, spherical deflector standards 48 support spherical deflector axle 45. At the take up roll 50, tubed tape is wound upon hub 52 by means of torque applied through hub drive shaft 54 from drive motor 56. As would be evident, the tape may be supplied to this apparatus by any source, including directly during the adhesive tape manufacturing process.

Thus, an improved adhesive tape tube former has been shown which greatly expedites the tube forming process. The invention is applicable to the design and manufacture of new dispensers and to previously designed signed or existing dispensers. The invention is also applicable for continuous production of tubed tape and storage of such tape upon rolls.

While preferred embodiments of the invention have been shown and described, it will be apparent to those skilled in the art that changes and modifications can be made in these embodiments without departing from the principals and spirit of the invention, the scope of which is defined in the appended claims.

For example, the configurator or configurator elements need not contact the adhesive tape at a plane perpendicular to the longitudinal path of the tape, but rather at some oblique or variable angle. Also, if tape contacting elements such as dowels, pegs, and the like are employed, they need not cooperate together in one transverse, tape crossectional plane; but rather may cooperate together at distinct regions along the tape longitudinal path.

I claim:

1. A method of forming a tube having throughout its outwardly oriented surface a pressure sensitive adhesive, said tube being formed from tape with adhesive applied to one side, where the method comprises:

(a) pulling the pressure sensitive adhesive tape past a tape contacting profile configurator to cause the tape to be formed transversely into the shape of an overlapping spiral with the adhesive oriented outwardly; and (b) permitting the opposite overlapping edges of the tape to become in mutual self adhesive contact so that the transverse spiral shape will close thereby forming a tube with the adhesive oriented outwardly; and (c) pulling the formed tube past a cutter; and (d) cutting the formed tube to a desired length.

2. The method as recited in claim 1, including:

(a) contacting an outer circumferential region of the formed tube against a tape platform, where said platform is located between the profile configurator and the cutter.

* * * * *